(12) United States Patent
Bhugra (10) Patent No.: US 7,200,008 B1
(45) Date of Patent: Apr. 3, 2007

(54) MULTI-DEPTH DRIVE ENCLOSURE

(76) Inventor: Kern S. Bhugra, 2890 Zanker Rd., San Jose, CA (US) 95134

( * ) Notice: Subject to any disclaimer, the term of this patent is extended or adjusted under 35 U.S.C. 154(b) by 53 days.

(21) Appl. No.: 10/884,523

(22) Filed: Jul. 1, 2004

(51) Int. Cl.
*H05K 5/00* (2006.01)

(52) U.S. Cl. ...................................... 361/724; 361/685

(58) Field of Classification Search ........ 361/724–727, 361/685, 683; 174/35 R; 312/223.1
See application file for complete search history.

(56) References Cited

U.S. PATENT DOCUMENTS

| | | | |
|---|---|---|---|
| 5,684,671 A * | 11/1997 | Hobbs et al. ................ | 361/683 |
| 6,317,329 B1 * | 11/2001 | Dowdy et al. ............... | 361/725 |
| 6,459,571 B1 * | 10/2002 | Carteau ....................... | 361/684 |
| 6,862,173 B1 * | 3/2005 | Konshak et al. ............. | 361/685 |
| 6,980,427 B2 * | 12/2005 | Garnett et al. .............. | 361/685 |
| 7,035,097 B2 * | 4/2006 | Petrov et al. ................ | 361/685 |
| 2002/0131242 A1 * | 9/2002 | Nagasawa ..................... | 361/727 |
| 2003/0016504 A1 * | 1/2003 | Raynham ..................... | 361/727 |
| 2003/0147220 A1 * | 8/2003 | Fairchild ..................... | 361/726 |

FOREIGN PATENT DOCUMENTS

WO   WO-2006007467 A2   1/2006

* cited by examiner

*Primary Examiner*—Lisa Lea-Edmonds

(57) ABSTRACT

An enclosure which comprises a set of removable canisters, a set of capsules within each canister, and at least one nonvolatile storage device that resides within each canister. A removable top on the enclosure provides individual access to the capsules. Canisters may also be removed from the front of the enclosure, thereby allowing dual access to a nonvolatile storage device.

29 Claims, 8 Drawing Sheets

MULTI-DEPTH DRIVE ENCLOSURE

FIELD OF THE INVENTION

The invention relates generally to the field of storage systems in storage environments and more particularly, to enclosures which may employ a redundant array of independent disks (RAID) architecture.

DISCUSSION OF RELATED ART

Storage systems in computing environments have become increasingly important, as the demand for storage space has grown exponentially with the arrival of the Internet and microprocessors capable of handling graphics, video and animation. In addition, demand for reliable storage resources to provide backup and availability in case of individual node failure has become increasing important.

Figure 1A:
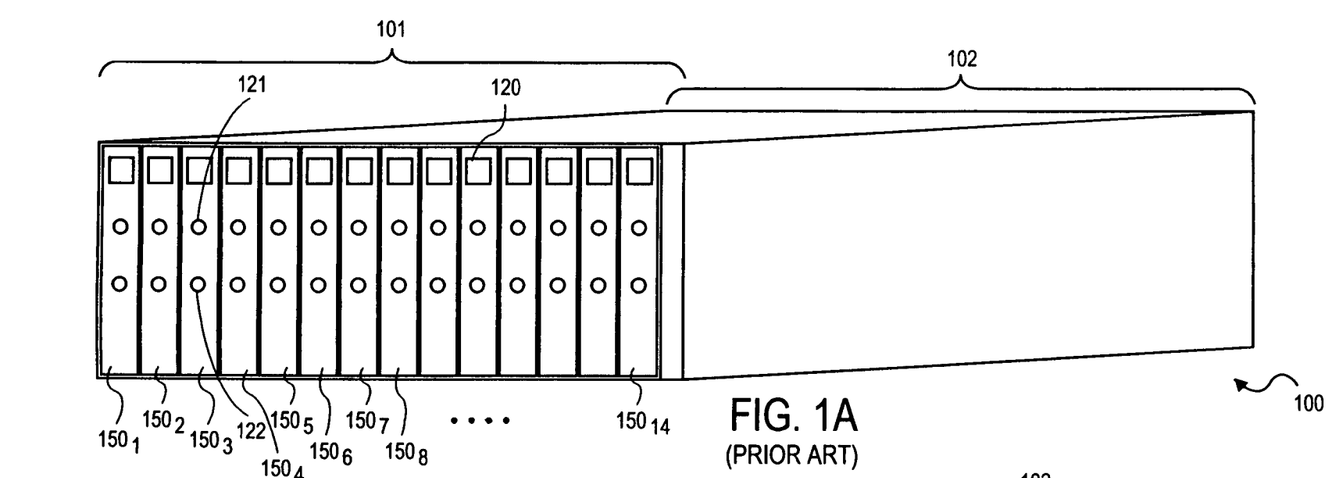
FIGS. 1A–1B illustrate a front and back view of an exemplary prior art storage enclosure 100.
Figure 1B:
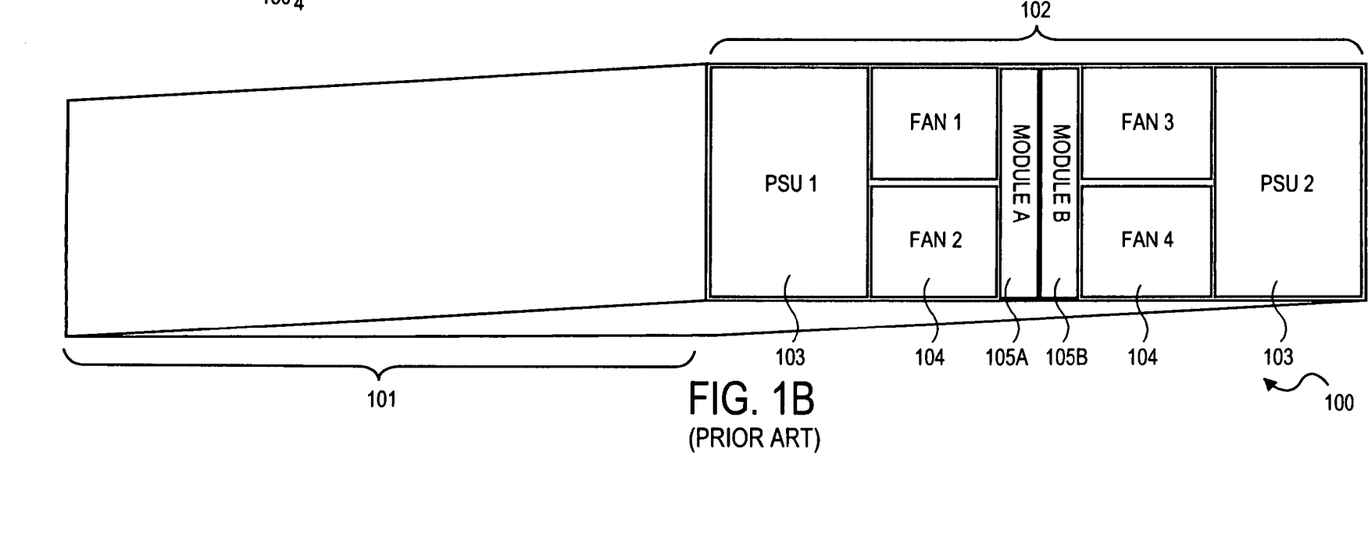

FIGS. 5A–1B illustrate a front and back view of a prior art storage enclosure 100. FIG. 1A is a front view 101 of prior art storage enclosure 100. Single disk carriers 150 are shown on front of storage enclosure 100. Each one of these single disk carriers 150 contain one nonvolatile disk drive (not shown). Each single disk carrier is cascaded together to form a logical volume in storage enclosure 100. A series of individual nonvolatile storage devices ("members") are cascaded to form a single logical volume. A single logical volume is created when one or more nonvolatile storage devices are coupled together. According to the prior art enclosure 100, only one nonvolatile disk drive can be stored in each one of single disk carriers 150. If a user has filled up each single disk carrier slot on storage enclosure 100 with one nonvolatile disk drive, then they must purchase another storage enclosure 100 to add capacity to their storage system.

Each individual one of the single disk carriers 150 has a pair of indicators, a status indicator (e.g., status indicator 121) and an activity indicator (e.g., activity indicator 122) showing a read/write/seek operation on a nonvolatile disk drive). These indicators correspond to their one nonvolatile disk drive within their particular single disk carrier 150 (e.g., single disk carrier $150_3$ for indicators 121, 122). The status indicator indicates that its nonvolatile disk drive is turned on. The activity indicator indicates that a read, write, or seek command is being processed by its nonvolatile disk drive. If a nonvolatile disk drive within a single disk carrier fails, a user must disengage the single disk carrier by pressing eject button 120. The single disk carrier corresponding to the failed nonvolatile disk drive is pulled outward from storage enclosure 100 after the eject button 120 is pressed.

FIG. 1B is a rear view 102 of the prior art storage enclosure 100. Typically, a storage enclosure has one or more power supply units 103, fans 104, and modules 105A and 105B. The power supply units 103 are redundant (e.g., more than one power supply per storage enclosure 100) to protect the storage enclosure 100 if one of the power supplies fail. Similarly, the fans 104 are redundant to protect against overheating if one of the fans 104 fail. Illustrated in FIG. 1B are four fans, however, typically there can be more or less fans and power supplies within a storage enclosure according to the prior art. Furthermore, fans 104 may be located within the power supplies. Modules 105A and 105B typically contain semiconductor chips (e.g., microprocessor and memory) for controlling the input/output (I/O) instructions to and from storage enclosure 100. The modules 105A and 105B are accessible from the rear of storage enclosure 100 according to the prior art. If one of the modules 105A or 105B fails, a user may have to disconnect storage enclosure 100 and replace the modules 105A and 105B from the back of storage enclosure 100.

SUMMARY

An enclosure which comprises a set of removable canisters, a set of capsules within each canister, and at least one nonvolatile storage device that resides within each canister. A removable top on the enclosure provides individual access to the capsules, in one exemplary embodiment. Canisters may also be removed from the front of the enclosure, so as to allow dual access to a nonvolatile storage device.

BRIEF DESCRIPTION OF THE DRAWINGS

The present embodiments are illustrated by way of example and not limitation in the figures of the accompanying drawings in which like references indicate similar elements.

DETAILED DESCRIPTION

A storage enclosure, canister, and flexible connector line for providing singularly removable, multiple nonvolatile storage devices within a single canister are described. Note that in this description, references to "one embodiment" or "an embodiment" mean that the feature being referred to can be included in at least one embodiment of the teachings described herein. Further, separate references to "one embodiment" in this description do not necessarily refer to the same embodiment; however, neither are such embodiments mutually exclusive, unless so stated and except as will be readily apparent to those skilled in the art.

Figure 2A:
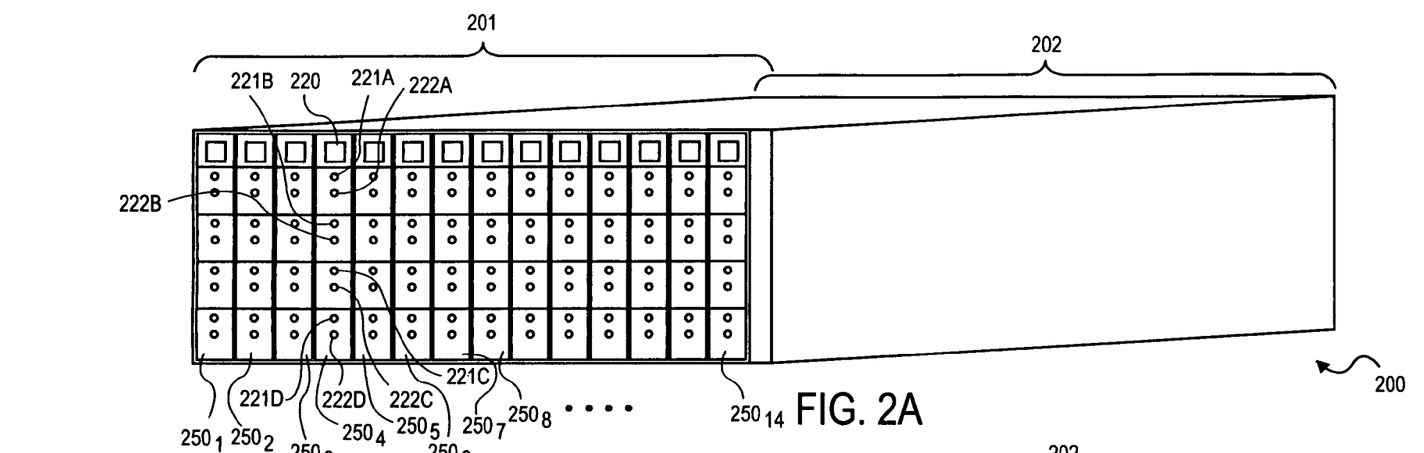
FIGS. 2A–2B illustrate a front and back view of an exemplary storage enclosure 200.
Figure 2B:
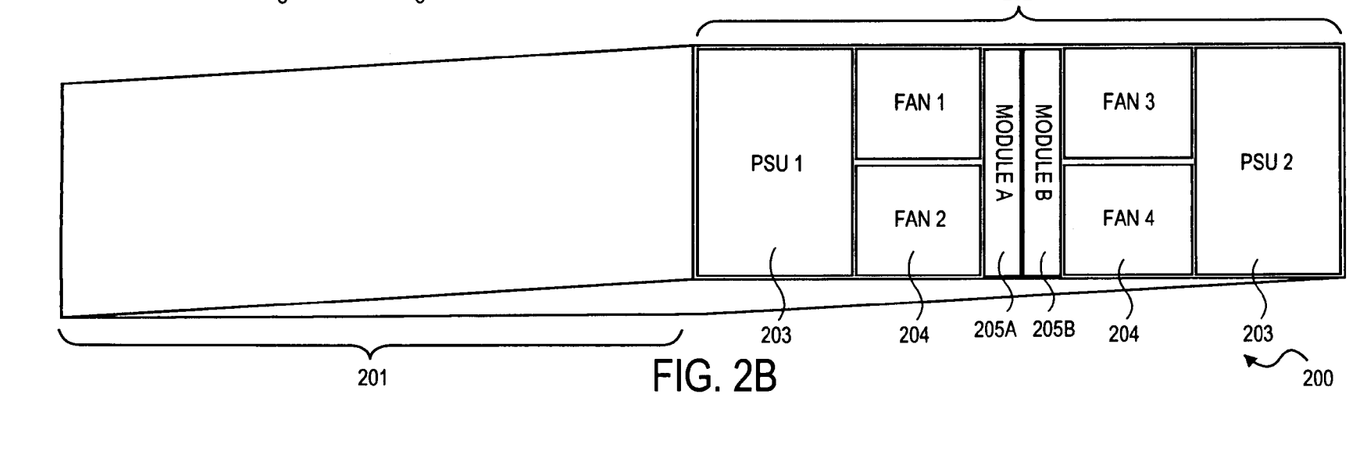
Figures 4A, 4B:
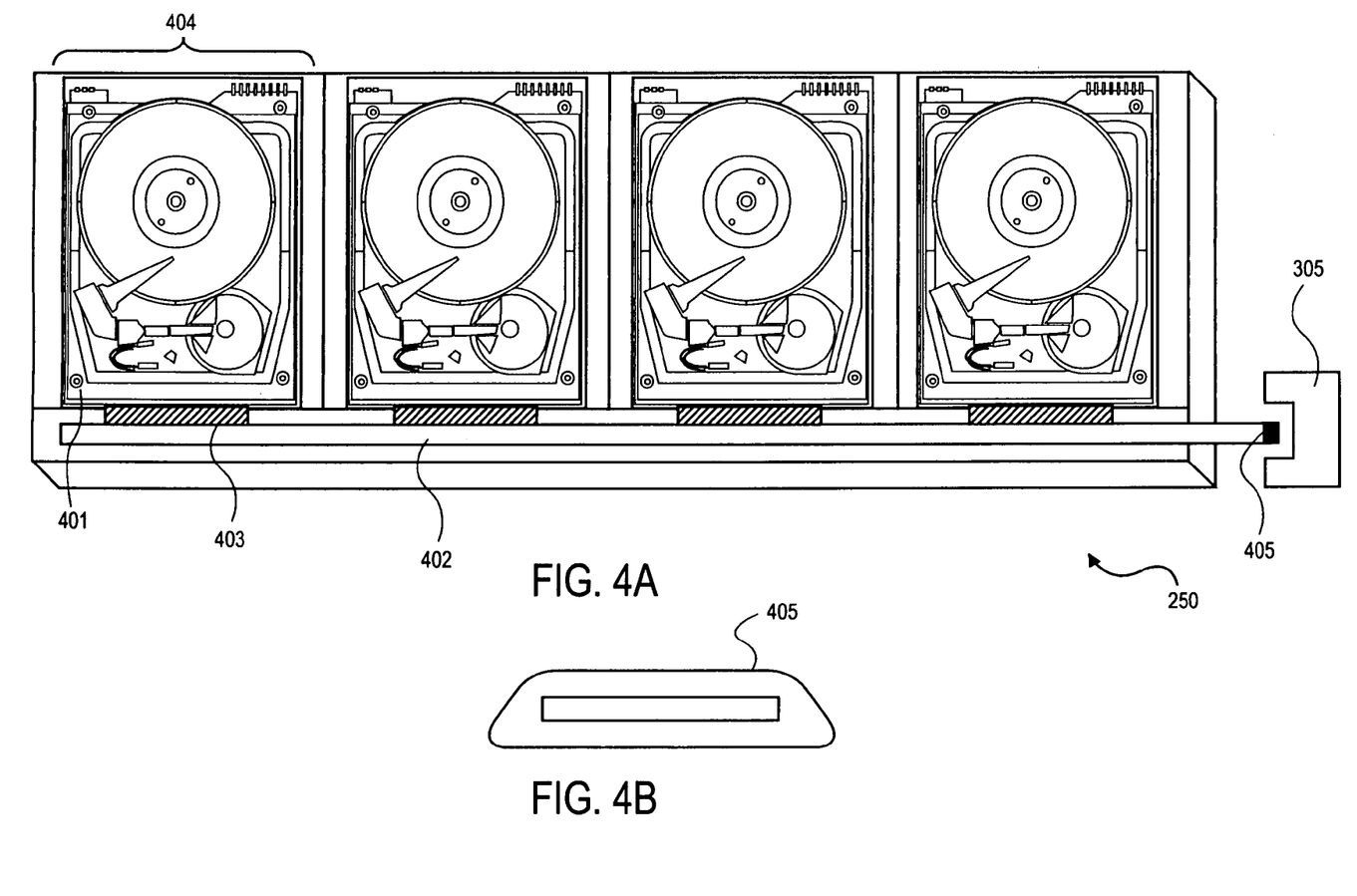
FIGS. 4A–4B illustrate an exemplary canister $250_1$ that can store four nonvolatile storage devices.

FIGS. 2A–2B illustrate a front and back view of a storage enclosure embodiment 200. FIG. 2A shows a front view 201 of a storage enclosure 200. The storage enclosure 200 includes a group of canisters 250, each containing a plurality of nonvolatile storage devices (a cross sectional view of the nonvolatile storage devices 401 within an exemplary canister having four nonvolatile storage devices 401 is illustrated in FIG. 4A). In one embodiment, the nonvolatile storage devices are serial ATA (SATA) hard drives. In another embodiment, the nonvolatile storage devices are parallel ATA (PATA) hard drives. The overall total cost of ownership should be lower as compared to the prior art enclosure because the cost of the power supplies, fans 204, and modules 205A and 205B are amortized over a larger number of nonvolatile storage devices in some cases (e.g., a user doesn't have to buy as many enclosure systems to support a required number of hard drives because one canister can support a plurality of hard drives). In one embodiment, the power supplies are 400 W to 700 W assuming that three power supplies are used in storage enclosure 200. Furthermore, there should be a reduced cost per slot (e.g., where a slot includes a connection point to a hard drive) in the embodiment shown in FIG. 2 because more individual nonvolatile storage devices can be accommodated within a single storage enclosure 200 in some cases. In the exemplary embodiment of FIG. 2A, each canister includes a unique status indicator for each hard drive and a unique activity indicator for each hard drive (e.g., canister $250_4$ has four status indicators 221A–D and four unique activity indicators 222A–D). (Here, note that FIG. 2A would therefore correspond to a canister having four hard drives as depicted in FIG. 4A.)

FIG. 2B is a rear view 202 of the storage enclosure 200 of FIG. 2A. The storage enclosure 200 comprises one or more power supply units 203, fans 204, and modules 205A and 205B. The power supply units 203 are redundant (e.g., more than one power supply per storage enclosure 200) to protect the storage enclosure 200 if one of the power supplies fail. Similarly, the fans 204 are redundant to protect against overheating if one of the fans 204 fail. Illustrated in FIG. 2B are four fans, however, just as in FIG. 1B, typically there can be more or less fans within a storage enclosure. Modules 205A and 205B typically contain semiconductor chips (e.g., a microprocessor, memory, ASICs, etc.) for controlling the input/output (I/O) instructions to and from storage enclosure 200.

In one embodiment, the modules 205A and 205B are redundant, and each module separately can control operations of all the canisters 250. In another embodiment, the modules 205A and 205B each control half the canisters 250 within each storage enclosure 200. The modules 205A and 205B are accessible from the rear of storage enclosure 200, as illustrated in FIG. 2B, and/or from the front of storage enclosure 200 (front access of modules will be discussed in greater detail later in FIG. 3B).

In one embodiment, if one of the modules 205A or 205B fail, a user may be able to remove and replace the modules 205A or 205B without bringing down the storage enclosure 200 (e.g., the modules 205A and 205B may be hot-swappable). In another embodiment, the power supplies, fans, and canisters may also be hot-swappable (e.g., can be removed without powering down the device or causing significant disruptions in quality of service).

Figure 3A:
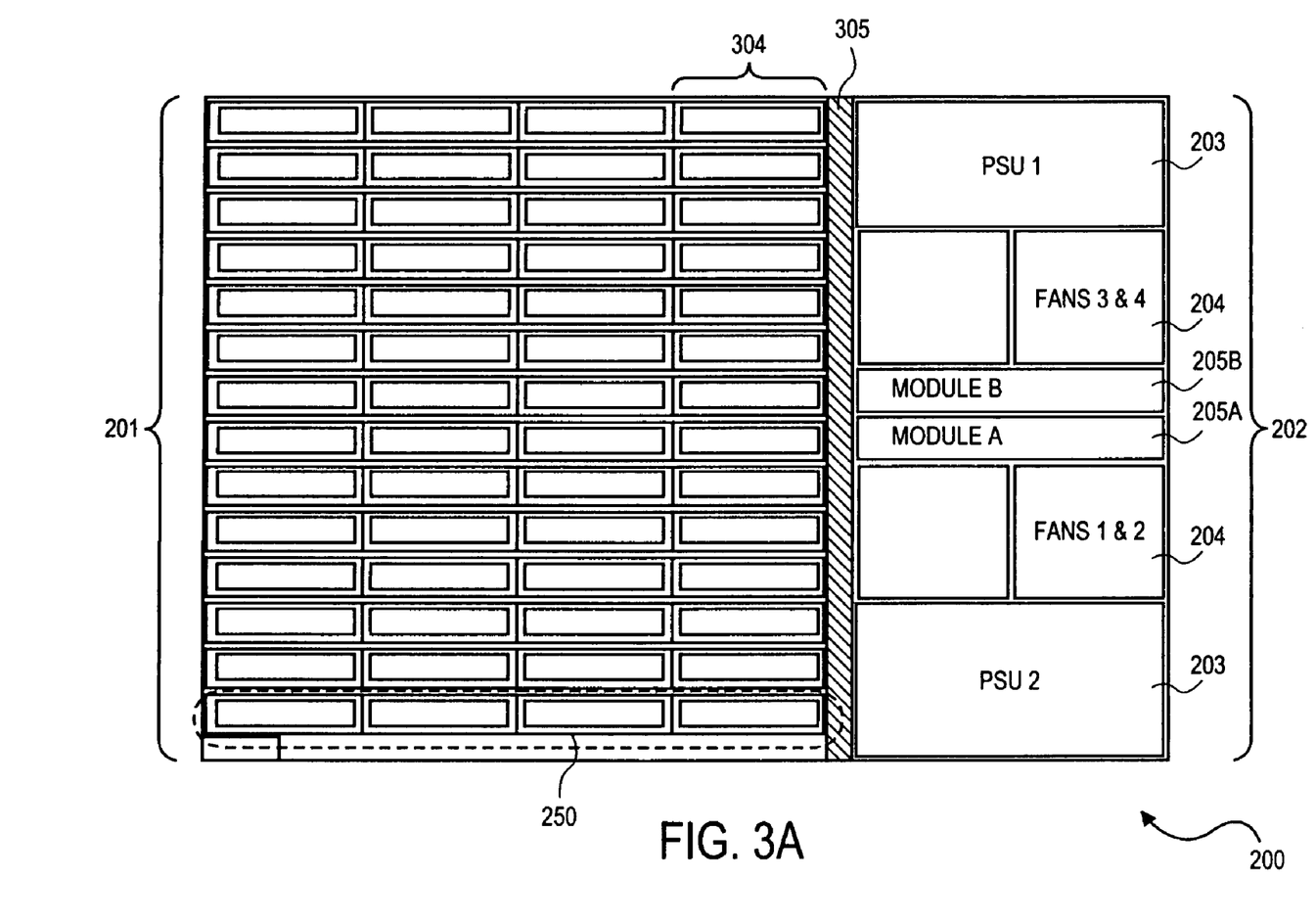
FIGS. 3A–3B illustrate cross-sectional views of an exemplary enclosures 200 and 300, and placement of modules.
Figure 3B:
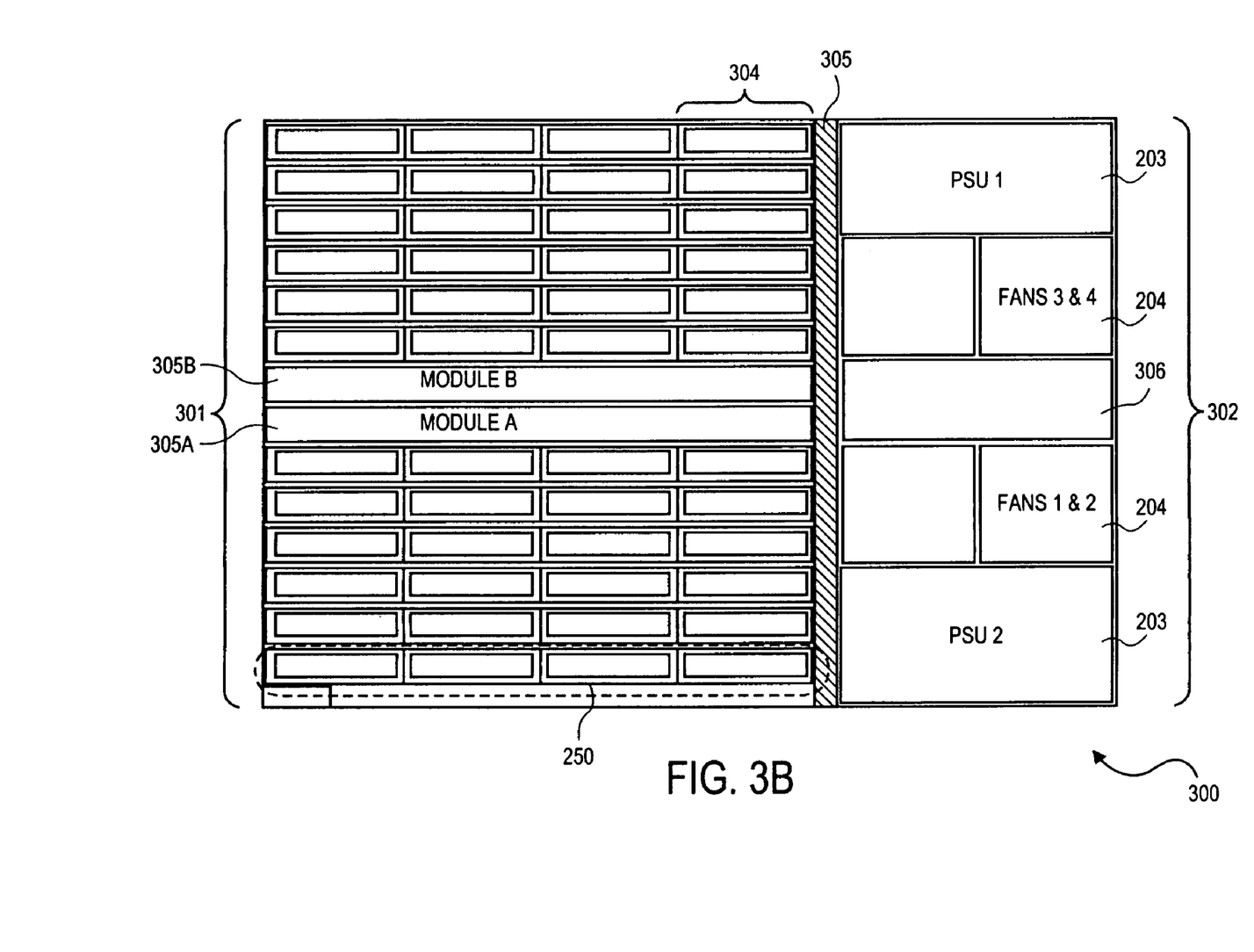

FIGS. 3A–3B illustrate cross-sectional views of two different exemplary enclosures 200 and 300. FIG. 3A illustrates a cross-sectional view of a storage enclosure 200 in which modules 205A and 205B are located at the back 202 of the storage enclosure 200. As a result of modules 205A and 205B being in the back 202 of the storage enclosure 200, a number of individual canisters 250 (fourteen in particular) are shown that encompass the front 201 of the storage enclosure 200 (see FIG. 2A for a front view of the storage enclosure 200). In one embodiment, height of 4 U (1 U=1.75 inches) (a U is a standard unit of height in the telecommunications industry) is used for the storage enclosure 200. In another embodiment, the storage enclosure 200 is 19 inches wide (e.g., length of 201) and 26 inches deep.

The cross-sectional view shown in FIG. 3A illustrates four individual capsules 304 within each canister $250_1$. Each capsule 304 contains a nonvolatile storage device 401 as will be later discussed in FIG. 4A and FIG. 7. In one embodiment, each capsule provides support/capability for high capacity and highRPM (rotations per minute) drives. A data tub is a very large storage device that may provide terabytes of storage space for users. A data tub can be provided in FIG. 3A by filling each canister $250_1$ with high capacity hard drives. High rpm drive capacity can be provided by filling the capsules 304 within each canister $250_1$ with hard drives that operate at a fast rpm (e.g., currently 10,000 to 15,000 rpm for a drive is considered fast, however, in the future this rpm range may increase). In another embodiment, a storage enclosure 200 can accommodate canisters optimized for drive RPM and for drive capacity.

In one embodiment, each canister is removable from the front 201 of storage enclosure 200 (e.g., a user can press an eject button 220 on a canister and physically pull outward the canister from storage enclosure 200). When the eject button for a particular canister (e.g., eject button 220 for canister $250_4$) is pressed by a user, the individual nonvolatile storage devices 401 within each capsule 304 of the canister are removed from power, and the activity (read/write/seek) on each nonvolatile storage device 401 is terminated.

In a further embodiment, when a canister is removed, current activity is completed or quiesced (e.g., finished active input/output) before the canister is ejected (e.g., if a read or write operation is currently being performed on one of the nonvolatile storage devices 401 within a canister, that operation is completed before the canister is ejected). The canister may be removed by operation of an electromechanical switch that ejects the canister only when the activity on a nonvolatile storage device 401 within the canister is terminated, and when it is safe to remove a nonvolatile storage device 401 without risk of interrupting active I/O or losing data.

The backplane 305 may be a printed circuit board onto which each of the canisters 250 connect. In one embodiment, a perpendicular arm 402 (see FIG. 4A for a graphical view of an embodiment of this perpendicular arm 402) within each canister connects its canister to the backplane 305. The perpendicular arm may be a printed circuit board (PCB) in one embodiment. The connector 405 is designed to support the appropriate data throughput. In one embodiment, a connector 405 through which high speed serial data may flow (e.g., 6 gigabit per second serial ATA) on a perpendicular arm 402 is used to connect the canister to the backplane 305. In the case of eight or sixteen canister embodiments, as will later be discussed in FIG. 5A, a capsule 504 may also connect onto a perpendicular arm 502 through a serial ATA connector 505 as shown later in FIG. 5A. In further embodiments, each capsule 304 is individually removable from nonvolatile storage device 200 without removing the canister (e.g., a capsule 304 is removed from the top of nonvolatile storage device 200 as illustrated by the capsule 504 eject in FIG. 7).

In one embodiment, the modules 205A and 205B contain microprocessors with software that determine the data I/O management and storage within each nonvolatile storage device 401 within the storage enclosure 200 (e.g., a microprocessor and software within module 205A and/or 205B determines which sector within a particular nonvolatile storage device 401 to store a particular block of data received from the network). In alternative embodiments, other types of semiconductor circuits may be used such as an ASIC or FPGA, or hardwired standard offering. FIG. 3A also illustrates redundant power supply units 203 and fans 204, as previously discussed with reference to FIG. 1 and FIG. 2A.

FIG. 3B illustrates a cross-sectional view of a storage enclosure 300 in which modules 305A and 305B are observable from the front 301 of the storage enclosure 300. In one embodiment, storage enclosure 300 is similar to storage enclosure 200 in FIG. 3A except that the modules 305A and 305B are observable from the front 301 of storage enclosure 300 rather than from the back 202 as illustrated in FIG. 3A. In one embodiment, modules 305A and 305B are similar to modules 205A and 205B in terms of functionality, but with a different form factor (e.g., a different physical size to account for the difference in the length of the storage enclosure 300 near the power supply units 203 and behind the backplane 305 verses in front of the backplane parallel to the canisters 250). In one embodiment, similar to FIG. 2A, the standard telecommunications industry height of 4 U (1 U=1.75 inches, a U is a standard unit of height in the telecommunications industry) is used for the storage enclosure 300 (and the canisters 250).

Unlike FIG. 2A, the storage enclosure 300 can be shorter in depth because the modules 305A and 305B are at the front. As such, in one embodiment the enclosure 300 illustrated in FIG. 3B is 19 inches wide (e.g., width of 301) and 22 inches deep as compared to 19 inches wide and 26 inches deep in the embodiment shown in FIG. 3A. For rack spaces that prefer a smaller depth, the enclosure 300 should be useful because it is shorter in depth. In the embodiment shown in FIG. 3B, if module 305A or 305B fail, a user may eject the module outward from the storage enclosure 300 by pressing a module eject button (not shown) on the front 301 of storage enclosure 300. Furthermore, indicators on the modules (e.g., showing activity, memory usage, power status, etc.) can be viewed from the front of storage enclosure 300, rather than from the back. In one embodiment, the module eject button is similar to the canister eject button 220.

Signal integrity should be well maintained for both FIG. 3A and FIG. 3B (e.g., noise should be reduced). A connector access board 306 allows connections extending from module 305A and 305B to pass through storage enclosure 300 to external connections in the network (not shown). Other embodiments of storage enclosure 300 are similar to as described with reference to FIG. 3A.

FIGS. 4A–4B illustrate a canister that can store four nonvolatile storage devices 401. In one embodiment, the four nonvolatile storage devices 401 are 3.5" hard drives. Each of the four nonvolatile storage devices are shown as placed within a canister 250. The four nonvolatile storage devices 401 may be any capacity nonvolatile storage device. In one embodiment, at least two nonvolatile storage devices 401 are logically grouped together to form a single member within a RAID system (e.g., multiple nonvolatile storage devices 401 appear to be one member onto which blocks of data can be stored by computers coupled to storage enclosure 200). Semiconductor circuitry and/or software configuration within a module may make a determination of how the individual nonvolatile storage devices 401 are grouped together in a RAID system.

In FIG. 4A, the four nonvolatile storage devices 401 connect to arm 402 through a nonvolatile storage device connector 403 on each nonvolatile storage device 401. FIG. 4A also illustrates that the perpendicular arm 402 extends from the canister outward into backplane 305. In one embodiment, the perpendicular arm 402 does not extend outward into backplane 305, but rather is flush to the backplane 305.

The perpendicular arm 402 may contain logic circuitry for translating parallel nonvolatile storage device 401 to/from a serial data stream that flows through a serial connector 405. Connector 405 connects the perpendicular arm 402 to the backplane 305. In one embodiment, the connector 405 is a high speed serial ATA connector as illustrated in FIG. 4B. The high speed serial ATA connector may operate at a transfer rate of 6 gigabits per second or higher in one embodiment.

Figures 5A, 5B:
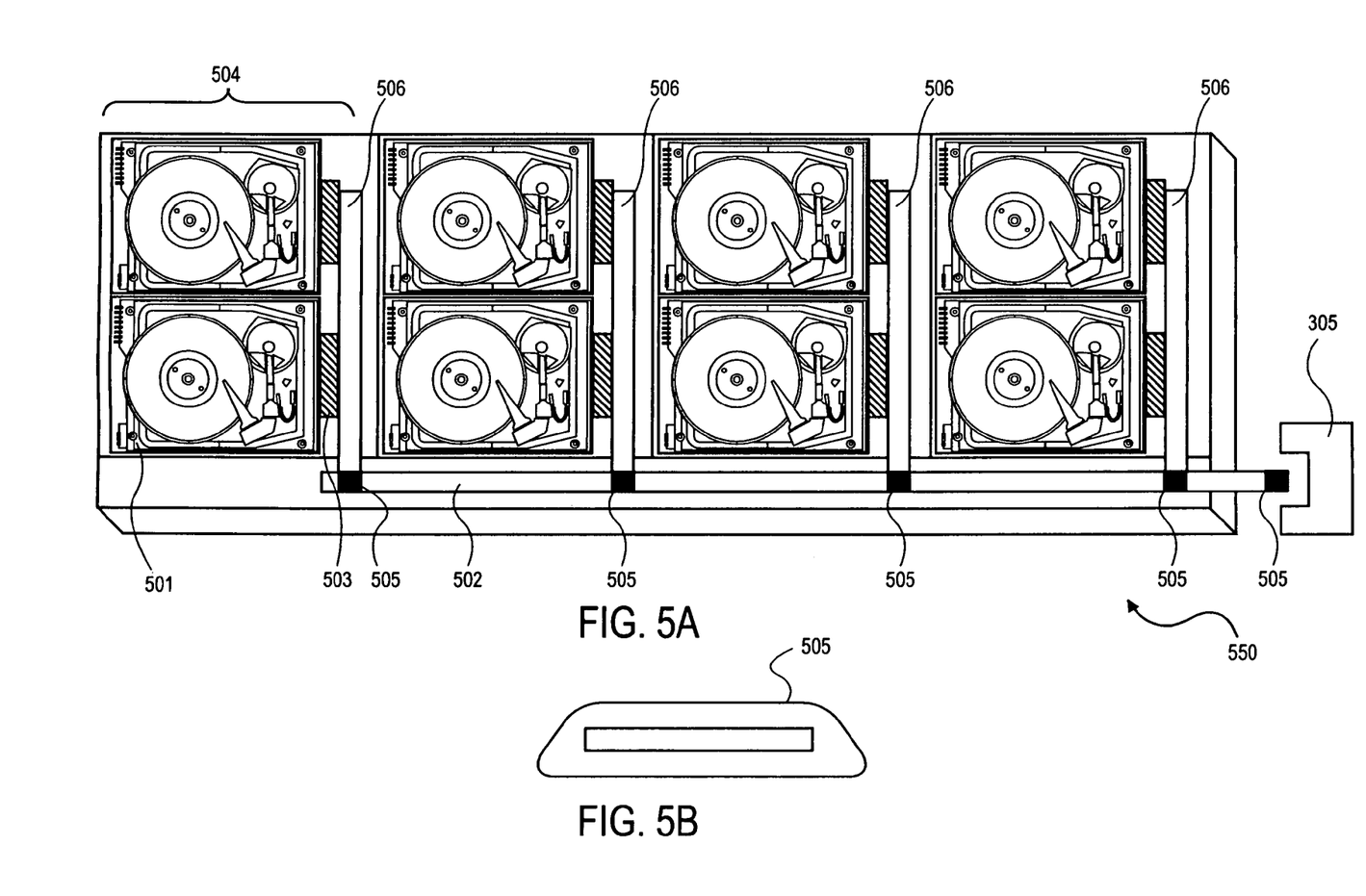
FIGS. 5A–5B illustrate an exemplary canister 550 that can store up to 16 nonvolatile storage devices.
Figure 7:
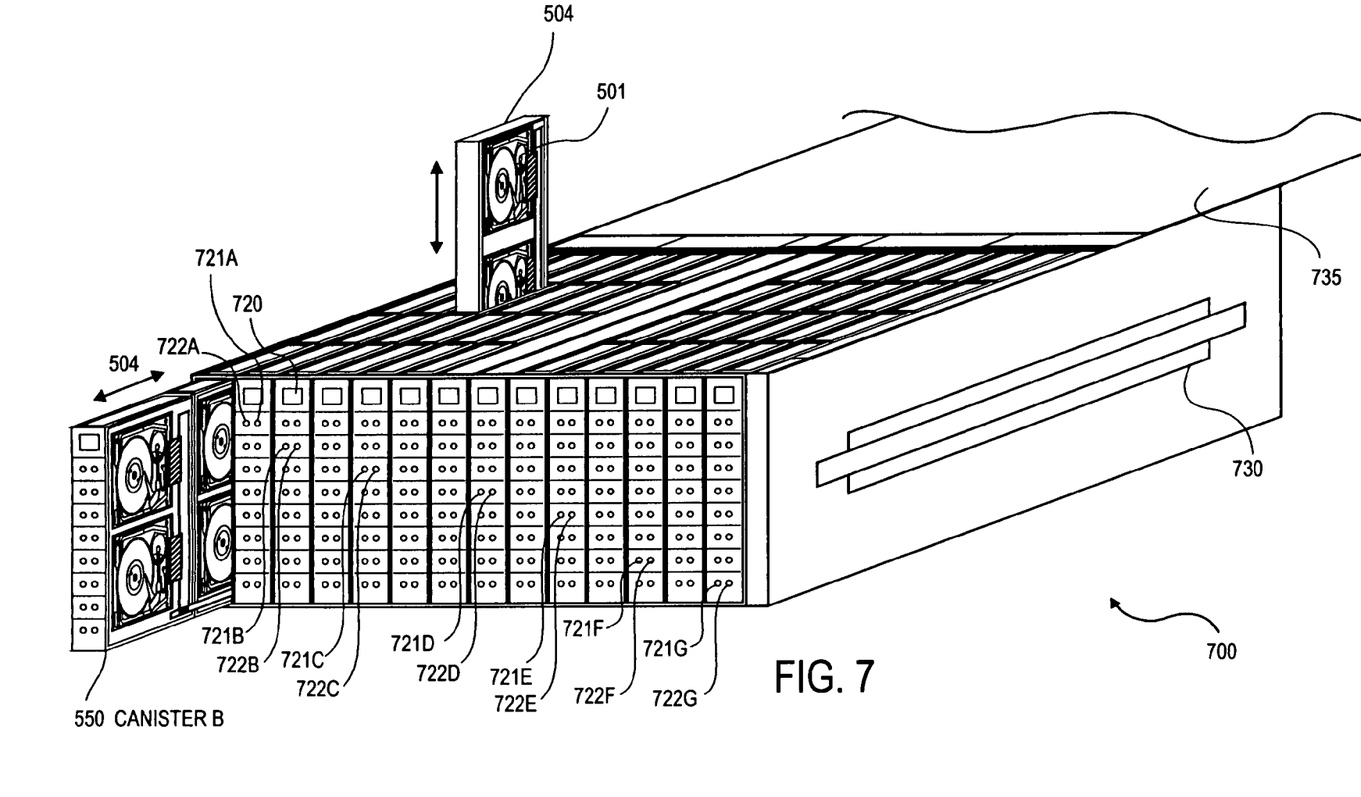
FIG. 7 illustrates a three dimensional view of an exemplary storage enclosure 700 in which a canister 550 is removed from the front of storage enclosure 700, and a capsule 504 within a canister 550 is removed from the top of storage enclosure 700.

FIGS. 5A–5B illustrate a canister 550 that can store 16 nonvolatile storage devices. Canister 550 in FIG. 5A is similar to the canister shown in FIG. 4A except that canister 550 is designed for accommodating sixteen nonvolatile storage devices. In an embodiment, the sixteen nonvolatile storage devices may be 2.5" hard drives. The sixteen nonvolatile storage devices may be any capacity nonvolatile storage device that fit with the appropriate form factor. In another embodiment, there may be only four nonvolatile storage devices which may be 2.5" hard drives. In another embodiment, one row of eight drives may be within each canister. There also exists a vertical beam for each capsule (i.e., each capsule has more than one hard drive). Here each of four vertical beams 506 connect four nonvolatile storage devices to perpendicular arm 502 (e.g., so that more than one nonvolatile storage device can be removed from a storage enclosure 700, as shown in FIG. 7, by vertically detaching a capsule 504 from the perpendicular arm 502).

Each vertical beam 506 includes a connector 505 that connects the vertical beam 506 to the perpendicular arm 502. In another embodiment, the connector 505 is a high speed serial ATA connector as illustrated in FIG. 5B. The high speed serial ATA connector may operate at a transfer rate of 6 gigabits per second or higher in one embodiment. Furthermore, capsule 504 in FIG. 5A is similar to capsule 404, as described in FIG. 4A, except that capsule 504 contains multiple nonvolatile storage devices in FIG. 5A rather than one. As such, when a user removes a capsule 504 from a storage enclosure, multiple nonvolatile storage devices are removed. Other embodiments of the canister 550 are similar to the canister $250_1$ as described in FIG. 4A.

In one embodiment, at least two nonvolatile storage device 501 are logically grouped together to form a single member within a RAID system. Semiconductor circuitry and/or software configuration within a module may make a determination of how the individual nonvolatile storage devices are grouped together in a RAID system in another embodiment. The modules may be customized for the appropriate number of nonvolatile storage devices per canister (e.g., a different module for sixteen hard drives per canister embodiment than for a four hard drive per canister embodiment). Other embodiments are similar to those described in FIGS. 4A and 4B.

Figure 6:
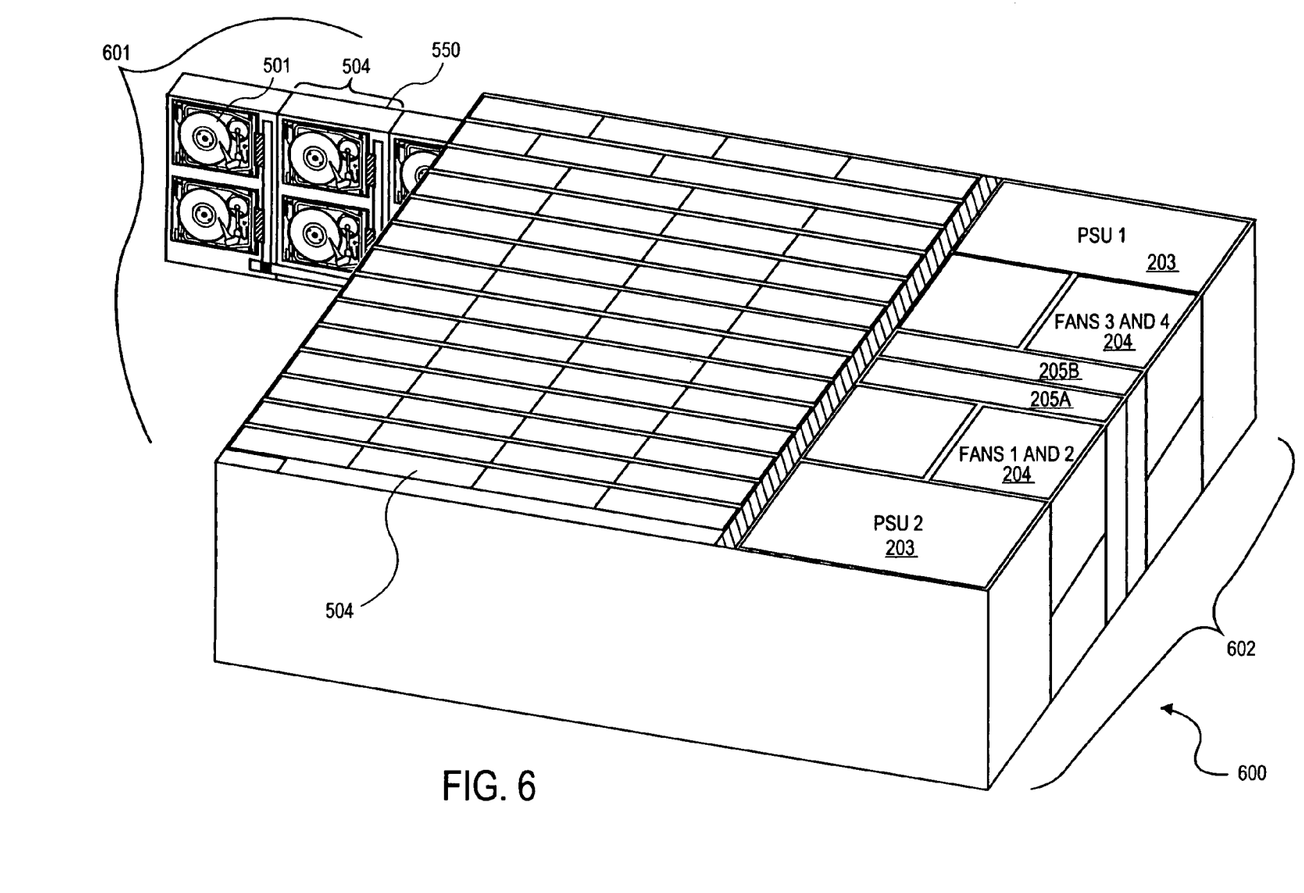
FIG. 6 illustrates an exemplary three dimensional view of a storage enclosure 600 in which a canister 550 is removed from the front of storage enclosure 600.

FIG. 6 illustrates a three dimensional view of a storage enclosure 600 in which a canister 550 is removed from the front of storage enclosure 600. The front of storage enclosure 600 is shown as 601 and the back is shown as 602. In the embodiment illustrated in FIG. 6, the nonvolatile storage device 501 within each canister 550 can only be removed from the front of storage enclosure 600. As such, a user must remove a set of eight nonvolatile storage devices 501 within the canister 550 in order to remove or replace a defective nonvolatile storage device 501 within a canister 550. An eject button, similar to the eject button 220 shown in FIG. 2A, may be pressed by a user to deactivate a particular canister that a user wishes to deactivate. The power supplies, fans 204, and modules 205A and 205B are similar to those as discussed with reference to FIG. 1B and FIG. 2B.

FIG. 7 illustrates a three dimensional view of a storage enclosure 700 in which a canister 550 can be removed from the front of storage enclosure 700 and a capsule 504 within a canister 550 can be removed from the top of storage enclosure 700. A set of rails 730 are placed on either side of storage enclosure 700 so that the storage enclosure 700 can easily slide outward from a rack of storage or networking equipment. Unlike the storage enclosure 600 as illustrated in FIG. 6, the storage enclosure in FIG. 7 can open from the top 735, and each individual capsule 504 within a canister 550 can be individually removed.

A user can slide out a storage enclosure 700 from a rack space by pulling the storage enclosure 700 forward and sliding forward on rails 730. After the storage enclosure 700 is slid forward, a user can manually open the top 735 of storage enclosure 700. A user can then pull on a capsule from the top of the storage enclosure 700 to lift a particular set of nonvolatile storage device 501 and its associated vertical beam 506 out of storage enclosure 700.

If there is only one nonvolatile storage device per capsule (as illustrated in FIG. 4A), then a user may directly pull out a nonvolatile storage device since no vertical beam is present. In another embodiment, a set of handles (not shown) located at the top of a capsule help a user to remove the nonvolatile storage devices (e.g., a user can remove a capsule by holding a handle and pulling the handle to lift a capsule). As such, a user does not have to disconnect all nonvolatile storage devices within a canister if they wish to only remove a single capsule of hard drives.

In one embodiment, the top 735 slides backward as illustrated in FIG. 7. In another embodiment, the top 735 opens from a pivot at the back of storage enclosure 700 similarly to the hood of a car.

Each canister 550 includes a plurality of status indicators 721A–G and a plurality activity indicators 722A–G (e.g., illustrated in FIG. 7 are eight status indicators and eight activity indicators). In the exemplary view in FIG. 7, there are fourteen canisters 550 in an enclosure 700 (as illustrated in FIG. 7). Each nonvolatile storage device 501 within a canister 550 is associated with one of the status indicators 721A–G and one of the activity indicators 722A–G (e.g., the canister 550 shown in the exemplary view in FIG. 7 includes eight sets of the indicators because a canister 550 may contain eight nonvolatile disk drives). Other embodiments of FIG. 7 are similar to those described in FIGS. 5 and 6.

It should be noted that various embodiments as described are not intended to limit the invention in any way. Numerous other embodiments are possible that are not explicitly defined in this specification but are within the scope of the present invention. For example, the storage enclosure may be applied to a variety of storage mediums and networking devices including, but not limited to, storage systems, RAID enclosures, high-performance external storage controllers, and Serial ATA storage subsystems, according to various embodiments of the present invention. In addition, canisters may have alternate physical configurations, and canisters may contain a different number of individual nonvolatile storage devices than what may be illustrated herein. As such, the figures and accompanying description is intended to be merely illustrative and not limiting onto the scope of the present invention.

What is claimed:

1. An enclosure, comprising:
   a set of canisters removable from any of a front and a back of the enclosure;
   a set of capsules in each of the set of canisters having a physical capacity to store at least one nonvolatile storage device; and
   a removable top of the enclosure to provide individual access the set of capsules.

2. The enclosure in claim 1, further comprising:
   a pair of modules parallel to the set of canisters that determine a logical arrangement of data in the at least one nonvolatile storage devices in the set of canisters.

3. The enclosure in claim 1, further comprising
   a set of first indicators displaying status of each of the at least one nonvolatile storage device; and
   a set of second indicators displaying activity of each of the at least one nonvolatile storage device.

4. The enclosure in claim 1, wherein the set of canisters are physically accessible from the enclosure without disrupting an operation of the enclosure.

5. The enclosure in claim 1, wherein the set of canisters are removable from the enclosure by pressing an eject button on each one of the set of canisters.

6. The enclosure in claim 5, wherein the set of capsules are individually accessible from the removable top of the enclosure.

7. A method, comprising
   forming a single logical volume from at least two nonvolatile storage devices in an enclosure;
   internally enabling a serial data transfer of a parallel data stream of the at least two nonvolatile storage devices; and
   deactivating a subset of the at least two nonvolatile storage devices when an eject button associated with the subset of the at least two nonvolatile storage devices is triggered.

8. A method, comprising:
   providing a multi-dimensional array of nonvolatile storage devices;
   accessing a subset of nonvolatile storage devices of the multi-dimensional array without a disruption of an operation of the subset of nonvolatile storage devices; and
   deactivating the subset of nonvolatile storage devices when an eject button associated with the subset of nonvolatile storage devices is triggered.

9. The method in claim 8, wherein the subset of nonvolatile storage devices are removed from a top of an enclosure encompassing the multi-dimensional array.

10. The method in claim 8, wherein the subset of nonvolatile storage devices is removed from a removable top of the enclosure encompassing the multi-dimensional array.

11. The method in claim 8, further comprising electro-mechanically ejecting the subset of nonvolatile storage devices after any of a suspension and completion of current operation of the subset of nonvolatile storage devices has been executed when the eject button is triggered.

12. The method of claim 7 further comprising converting a data stream between a serial form and a parallel form and when a serial transfer rate is at least 6 gigabits per second.

13. An apparatus, comprising:
   a plurality of capsules in a canister having a physical capacity to store at least one nonvolatile storage device; and
   a physical connector of the canister having logic circuitry to electrically couple the canister to a backplane of an enclosure;
   wherein a particular capsule of the plurality of capsules is individually vertically detachable from the physical connector of the canister and wherein the at least one nonvolatile storage device is removable from the enclosure.

14. The apparatus of claim 13 further comprising a device connector of the particular capsule coupling the particular capsule to the physical connector of the apparatus.

15. The apparatus of claim 14 further comprising a vertical beam coupling the particular capsule to the device connector.

16. The apparatus of claim 14 further comprising a serial connector facilitating communication between the physical connector of the canister and the backplane of the enclosure.

17. The apparatus of claim 16 wherein the device connector and the serial connector supports transfer rates of at least 6 gigabits per second.

18. The apparatus of claim 13 wherein the physical connector of the canister translates a data stream between a serial form and a parallel form.

19. The apparatus of claim 13 further comprising a plurality of status indicators and a plurality of activity indicators of each nonvolatile storage device to visually indicate an operational status of the at least one nonvolatile storage device.

20. The apparatus of claim 13 wherein the canister is physically accessible from any of a front and a back of an enclosure without disrupting an operation of the enclosure.

21. The apparatus of claim 20 further comprising an eject button to trigger any of a suspension and completion of current operation of the at least one nonvolatile storage.

22. The apparatus of claim 21 wherein the canister is physically ejectable electromechanically after the eject button triggers any of the suspension and completion of current operation of each nonvolatile storage device.

23. The apparatus of claim 13 wherein at least two nonvolatile storage devices are logically connected to form a member in a RAID system.

24. An enclosure, comprising:
a plurality of canisters, each of the plurality of canisters having a plurality of capsules;
a set of nonvolatile storage devices in the plurality of capsules physically accessible from a top of the enclosure;
a plurality of modules that determine a data management of the set of nonvolatile storage devices;
a backplane to facilitate electrical connections of the enclosure;
a plurality of power supply units and fans to maintain proper operation of the set of nonvolatile storage device; and
wherein any of a canister, module, power supply unit and fan is physically accessible from any of a front and back of the enclosure without disrupting an operation of the set of nonvolatile storage devices.

25. The enclosure of claim 24 further comprising a physical connector of a particular canister having logic circuitry to electrically couple the particular canister to the backplane of the enclosure.

26. An apparatus, comprising:
a plurality of capsules in a canister having a physical capacity to store at least one nonvolatile storage device;
a physical connector of the canister having logic circuitry to electrically couple the canister to a backplane of an enclosure;
a device connector of a particular capsule of the plurality of capsules coupling the particular capsule to the physical connector of the apparatus; and
a vertical beam coupling the particular capsule to the device connector.

27. An apparatus, comprising:
a plurality of capsules in a canister having a physical capacity to store at least one nonvolatile storage device;
a physical connector of the canister having logic circuitry to electrically couple the canister to a backplane of an enclosure; and
an eject button to trigger any of a suspension and completion of current operation of the at least one nonvolatile storage.

28. The apparatus of claim 27 wherein the canister is physically ejectable electromechanically after the eject button triggers any of the suspension and completion of current operation of each of the at least one nonvolatile storage device.

29. An apparatus, comprising:
a plurality of capsules in a canister having a physical capacity to store at least one nonvolatile storage device; and
a physical connector of the canister having logic circuitry to electrically couple the canister to a backplane of an enclosure,
wherein at least two nonvolatile storage devices are logically connected to form a member in a RAID system.

* * * * *